US010872149B1

(12) United States Patent
Alexander et al.

(10) Patent No.: US 10,872,149 B1
(45) Date of Patent: Dec. 22, 2020

(54) ANOMALY DETECTION BASED ON SIDE-CHANNEL EMANATIONS

(71) Applicant: Vencore Labs, Inc., Basking Ridge, NJ (US)

(72) Inventors: Scott Alexander, Basking Ridge, NY (US); Josephine Micallef, Basking Ridge, NJ (US); Joshua Morman, Basking Ridge, NJ (US); Euthimios Panagos, Basking Ridge, NJ (US); Marc Pucci, Basking Ridge, NJ (US); Simon Tsang, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 175 days.

(21) Appl. No.: 16/045,368

(22) Filed: Jul. 25, 2018

Related U.S. Application Data

(60) Provisional application No. 62/536,631, filed on Jul. 25, 2017.

(51) Int. Cl.
*G06F 21/55* (2013.01)
*G06F 21/56* (2013.01)

(52) U.S. Cl.
CPC .......... *G06F 21/556* (2013.01); *G06F 21/566* (2013.01); *G06F 21/567* (2013.01); *G06F 21/562* (2013.01)

(58) Field of Classification Search
CPC ...... G06F 21/56; G06F 21/566; G06F 21/567; G06F 21/562; G06F 21/556; G06F 3/167; G06F 9/451
See application file for complete search history.

(56) References Cited

U.S. PATENT DOCUMENTS

| 2016/0127124 | A1* | 5/2016 | Prvulovic | H04L 9/003 380/28 |
| 2016/0352508 | A1* | 12/2016 | Guillen-Hernandez | H04L 9/003 |
| 2017/0277560 | A1* | 9/2017 | Lucas | G06F 8/35 |
| 2018/0007074 | A1* | 1/2018 | Kune | G06F 1/28 |
| 2018/0013779 | A1* | 1/2018 | Aguayo Gonzalez | H04L 63/06 |

OTHER PUBLICATIONS

Yinqian Zhang, Cross Tenant Side-Channel Attacks in PaaS Cloud, Nov. 3-7, 2001, pp. 990-1003 (Year: 2014).*

(Continued)

*Primary Examiner* — Kristine L Kincaid
*Assistant Examiner* — Shaqueal D Wade
(74) *Attorney, Agent, or Firm* — Heslin Rothenberg Farley & Mesiti P.C.

(57) ABSTRACT

A computer program product, a computer-implemented method, and a computer system include a processor(s) that obtains side channel emanations from a device. The processor(s) analyzes the side channel emanations to identify distinct emanation patterns and timing characteristics, wherein the timing characteristics are associated with transitions between the distinct emanation patterns. The processor(s) generates a non-deterministic finite automaton (NFA) by correlating the distinct emanation patterns with states of the device, where the NFA captures states and state transitions of the device. The processor(s) identifies an anomaly in the device, based on deviation in emanations from the device.

20 Claims, 9 Drawing Sheets

(56) References Cited

OTHER PUBLICATIONS

Theodorou et al., "An Overview of Automati Audio Segmentation", I.J. Information Tehnology and Computer Science, 2014, vol. 6, No. 11, 9 pages.

Peiszer et al., "Automatic Audio Segmentation: Segment Boundary and Structure Detection in Popular Music", In Proceedings of the 2nd International Workshop on Learning the Semantics of Audio Signals (LSAS), (2008), ISBN: 978-3-9804874-7-4, 15 pages.

Jonathan Foote: "Automatic Audio Segmentation Using a Measure of Audio Novelty", In Proc. ICME, vol. 1, New York City, New York, USA, 2000, 4 pages.

* cited by examiner

|     | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ |
|---|---|---|---|---|---|---|---|---|---|---|---|---|
| $P_1$ | 0 | 50 | 300 | 370 | 390 | 890 | 940 | 1190 | 1260 | 1280 | 1780 | 1830 |
| $P_2$ |   | 0 | 250 | 320 | 340 | 840 | 890 | 1140 | 1210 | 1230 | 1730 | 1780 |
| $P_3$ |   |   | 0 | 70 | 90 | 590 | 640 | 890 | 960 | 980 | 1480 | 1530 |
| $P_4$ |   |   |   | 0 | 20 | 520 | 570 | 820 | 890 | 910 | 1410 | 1460 |
| $P_5$ |   |   |   |   | 0 | 500 | 550 | 800 | 870 | 890 | 1390 | 1440 |
| $P_6$ |   |   |   |   |   | 0 | 50 | 300 | 370 | 390 | 890 | 940 |
| $P_7$ |   |   |   |   |   |   | 0 | 250 | 320 | 340 | 840 | 890 |
| $P_8$ |   |   |   |   |   |   |   | 0 | 70 | 90 | 590 | 640 |
| $P_9$ |   |   |   |   |   |   |   |   | 0 | 20 | 520 | 570 |
| $P_{10}$ |   |   |   |   |   |   |   |   |   | 0 | 500 | 550 |
| $P_{11}$ |   |   |   |   |   |   |   |   |   |   | 0 | 50 |
| $P_{12}$ |   |   |   |   |   |   |   |   |   |   |   | 0 |

US 10,872,149 B1

ANOMALY DETECTION BASED ON SIDE-CHANNEL EMANATIONS

CROSS-REFERENCE TO RELATED APPLICATION

This application claims priority to U.S. Provisional Application No. 62/536,631 filed Jul. 25, 2017, entitled, "ANOMALY DETECTION BASED ON SIDE-CHANNEL EMANATIONS" which is incorporated herein by reference in its entirety.

GOVERNMENT RIGHTS STATEMENT

This invention was made with U.S. Government support under contract number FA8650-16-C-7623 awarded by the Defense Advanced Research Projects Agency of the U.S. Department of Defense. The government has certain rights in the invention.

BACKGROUND OF INVENTION

Attackers currently employ sophisticated methods and exploits in order to gain access to various types of systems, ranging from traditional IT assets (e.g., routers, firewall, desktops, and servers) to Internet of Things (IoT) devices. The IoT is a system of interrelated computing devices, mechanical and digital machines, objects, animals and/or people that are provided with unique identifiers and the ability to transfer data over a network. Attackers have succeeded in bypassing installed security measures. And while typical IT assets have sufficient computation and storage resources to house various cyber-security solutions (e.g., intrusion detection and prevention systems) that can detect and, in some cases, prevent malicious code, many IoT devices have severe limitations in memory, storage, and computing power to accommodate such solutions.

SUMMARY OF INVENTION

Shortcomings of the prior art are also overcome and additional advantages are provided through the provision of a method for anomaly detection in a device based on side channel emanations. The method includes: obtaining, by one or more processors, side channel emanations from a device; analyzing, by the one or more processors, the side channel emanations to identify distinct emanation patterns and timing characteristics, wherein the timing characteristics are associated with transitions between the distinct emanation patterns; generating, by the one or more processors, a non-deterministic finite automaton (NFA) by correlating the distinct emanation patterns with states of the device, wherein the NFA captures states and state transitions of the device; and identifying, by the one or more processors, an anomaly in the device, based on deviation in emanations from the device.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics processor unit). Additionally, items denoted as processors may include hardware and/or software processors or other processing means, including but not limited to a software defined radio and/or custom hardware.

Technical limitations of IoT devices which prevent the utilization of established intrusion prevention techniques. Embodiments of the present invention include a computer-implemented method, a computer program product, and a computer system where program code, executing on at least one processing resource, detects IoT device anomalous/malicious behavior by collecting observations about how device components interact with their physical environment via side-channel emanations (e.g., electromagnetic emissions). Specifically, one or more programs executing on one or more processing devices to execute specific logic in order to analyze these observations. IoT devices that can be monitored for anomalies by embodiments of the present invention include, but are not limited to, environmental sensors, smart lightbulbs, personal fitness trackers, smart meters, and other devices that may use an embedded microcontroller or in embedded microprocessor.

Figure 1:
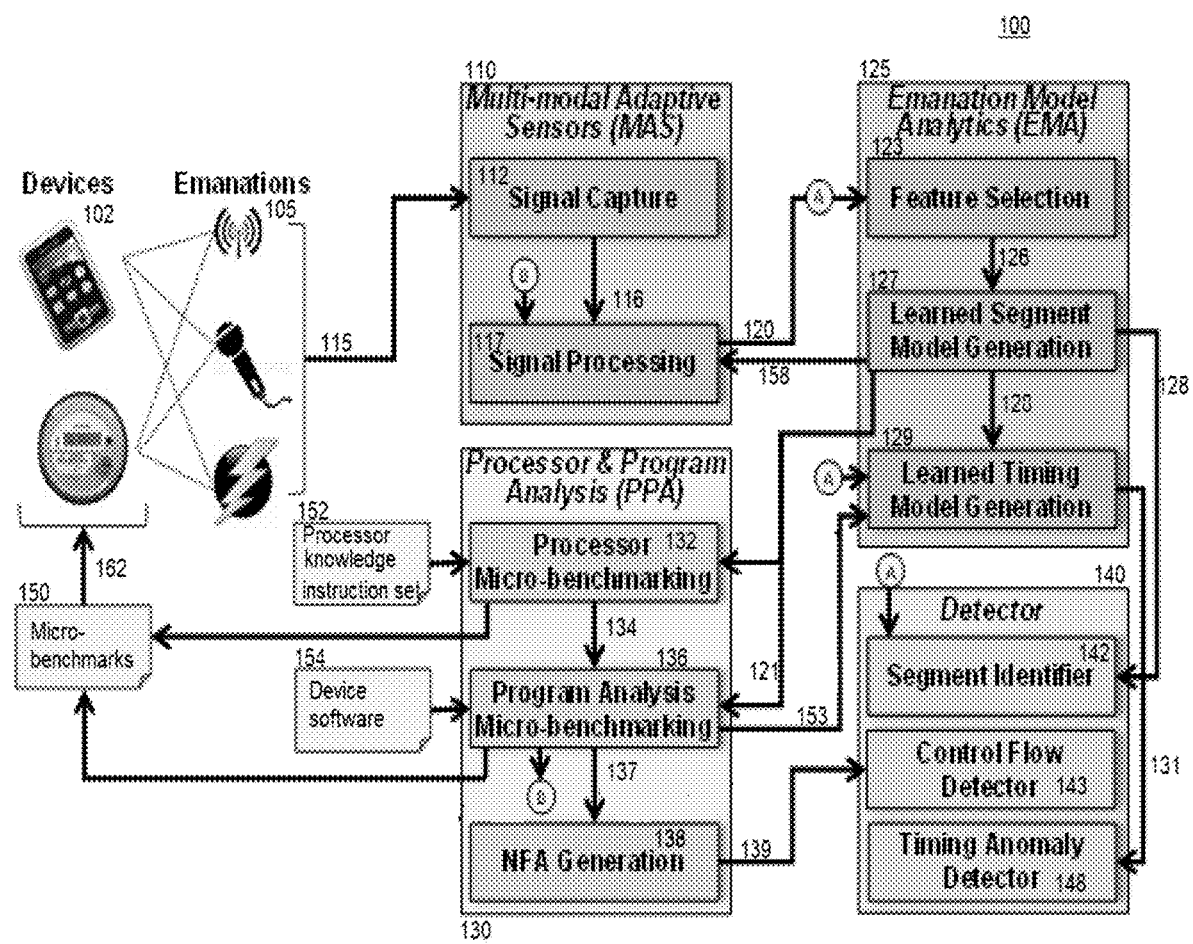
FIG. 1 depicts a combined high-level architecture and workflow that illustrates the various aspects of some embodiments of the present invention.

Embodiments of the present invention are inextricably tied to computing and provide advantages over existing intrusion prevention techniques. Intrusion protection in IoT devices is a problem unique to computing and aspects of various embodiments of the present invention address this problem utilizing computing resources, as illustrated in FIG. 1, in a manner that is not reproducible without these resources, including the utilization of adaptive sensors, signal processing, and machine learning, and for at least these reasons, these aspects are inextricably tied to computing. Aspects of various embodiments of the present invention provide advantages over existing techniques because existing techniques rely on the processing resources of computing devices in order to ensure the security of the devices. As explained above, certain devices, such as IoT devices, do not have the processing capacity to utilize these existing techniques. Thus, embodiments of the present invention provide an approach to intrusion detection that is not limited by processing constraints.

Processor-based devices leak information about their activity through correlations of processor activity and unintentionally externally observed information (i.e., side channels) in various forms, such as electromagnetic emanations, power draw, heat, sound, and light, among others. Current procedures attempt to analyze these emanations for the purpose of learning information about the device of origin, including but not limited to, including cryptographic keys stored on the devices. Current procedures may also use side-channel emanations to learn about the behavior of a specific device, including enabling one or more programs to profile the device.

Embodiments of the present invention include a computer-implemented method, a computer system, and a computer program product that: 1) determine the normal device behavior of a given device, including an IoT device, from side channel emanations; and 2) detect anomalies based on observed behavior diverging from the normal behavior. In an embodiment of the present invention a method performed can be separated into two phases: 1) a training phase, where one or more programs effectively learn the normal behavior (e.g., a learned model) of a device from the side channel emanations; and 2) a monitoring phase, where the one or more programs detect anomalies when observed behavior diverges from the learned model from the side channel emanations. In some embodiments of the present invention, based on the results of the monitoring phase, the program code executing on a processing resource, in embodiments of the present invention, can take remedial actions, including but not limited to, disabling certain portions of the device (e.g., network communications), and/or alerting a user to the issue.

Embodiments of the present invention may be collectively referred to as Combined Adaptive Sensing for Pervasive Event Reconstruction (CASPER). Aspects of some embodiments of the present invention, which are described in greater detail below and are accomplished by one or more programs (also referred to herein as program code) executing on one or more processing devices, include signal processing, program analysis, and machine learning. As discussed in greater detail below, embodiments of the present invention may include a micro-benchmarking and emanation identification aspect, in which one or more programs create models of analog emanations expected for device software segments. Embodiments of the present invention may also include a normal behavior characterization aspect, which includes one or more programs determining a normal timing model for device software segments, and generating a non-deterministic finite automata (NFA) model for typical states and state transitions of the device. Embodiments of the present invention also include a monitoring aspect, which includes one or more programs detecting deviations from NFA and timing models. In the event that the one or more programs detect an anomaly, based on side-channel emanations, the one or more programs may take remedial actions, including but not limited to, disabling certain portions of the device (e.g., network communications), and/or alerting a user to the issue. As understood by one of skill in the art, various aspects of some embodiments of the present invention are separated by function for illustrative purposes only and the same functionality can be accomplished, in some embodiments of the present invention, by a given program or program module. Thus, the separation of the functionality does not introduce any limitations in implementation of these aspects.

FIG. 1 is a combined high-level architecture and workflow 100 that illustrates various components of a proposed anomaly detection system and method in accordance with various aspects of embodiments of the present invention. As illustrated in FIG. 1, the aspects pictured include the various methods for collecting and analyzing side-channel emanations from a device, including but not limited to, an IoT device.

Referring to FIG. 1, for ease of understanding, certain of the functionality of embodiments of the present invention may be understood as a combination of different program modules/functionality. The separation of the one or more programs that comprise embodiments of the present invention into modules is done, herein, for descriptive purposes only and not the limit the structure of the invention. Embodiments of the present invention may include certain aspects such as an advanced signal processing referred to as Multimodal Adaptive Sensors (MAS), machine learning referred to as Emanation Model Analytics (EMA), program analysis referred to as Processor & Program Analysis (PPA), and a multi-pronged model divergence detection referred to as a Detector. In some embodiments of the present invention, these aspects are combined and may work together in an iterative process to create a detailed model of normal device behavior and to detect attacks (which represent departures from this model). These four modules and/or functionalities are portrayed separately in FIG. 1 for illustrative purposes. Throughout FIG. 1 "A" and "B" appear as signifiers to designate key inputs or outputs. "A" designates labeled, interesting emanation vectors, and "B" designates loop markers.

In some embodiments of the present invention, MAS 110 include one or more programs that characterize a device and collect and transform relevant artifacts into indicators of device activities. In embodiments of the present invention, MAS 110 capture analog sensory inputs 115 from multiple domains or modalities including, but not limited to, RF emissions, acoustic emissions, and/or power fluctuations. MAS 110 employ a variety of techniques (e.g., adaptive event processing, array-assisted cross ambiguity function, principal component analysis, self-coherence restoral, independent component analysis, novelty detection) for generating emanation feature vectors 120 that can be processed by EMA 125. Concurrently captured emanations corresponding to different modalities (e.g., RF and acoustic) or the same modality, but using different apparatus (e.g., different antennas) or apparatus orientation and/or distance from the device (e.g., 1 in and 12 in distance). As depicted in FIG. 1, MAS 110 capture 112 analog sensory inputs 115 by way of emanations 105 from devices 102, generate digital signals 116, and provide the digital signals 116 for processing 117 to generate emanation feature vectors 120, which are transmitted 122 to the EMA 125. The learned segment model generation 127, performed as part of EMA 125, provides parameter adjustments 158 processing 117.

In some embodiments of the present invention, EMA 125 include supervised (e.g., support vector machine) and unsupervised (e.g., clustering and multi-scale analysis) machine learning techniques for identifying distinct device states and state transitions using the feature vectors generated by MAS 110. Because MAS 110 generated feature vectors correspond to a high dimensionality space, in EMA 125, one or more programs may employ several techniques for reducing data dimensionality, in order to select 123 one or more features 126 that can efficiently discriminate the various devices states. Example feature selection techniques 123 include, but are not limited to, Mutual Information and V-Matrix. EMA 125 can identify distinct device states and state transitions by using a combination or some/all of the MAS-generated feature vectors for these modalities and settings.

In some embodiments of the present invention, PPA 130 applies processor knowledge and program analysis to better understand the structure of the device code. One or more programs utilize PPA 130 when a device processor and executing logic (e.g., source and/or binary code) are available. PPA 130 creates 132 micro-benchmarks 150, 136 to characterize the processor and known code and to create a succinct control flow model of the device software 154 in the form of a Nondeterministic Finite Automaton (NFA) 139 annotated with segment labels, so that one or more programs referred to as a Control Flow Detector 143 (part of the Detector 140) can use it to check if that program is executing normally. To facilitate efficient determination of distinguishable code segments, PPA 130 may perform both processor-specific micro-benchmarking 132 and program-specific micro-benchmarking 136 operations. One or more programs can perform processor-specific micro-benchmarking 132 based on obtaining processor knowledge and/or instruction set 152. The one or more programs perform program-specific micro-benchmarking 136 based on obtaining device software 154. When the device processor (e.g., processor knowledge and/or instruction set 152) and execution logic (e.g., device software 154) are not available, PPA 130 constructs the NFA 138 using the device states and state transitions identified by EMA 125. Each distinct device state corresponds to a node in the NFA 138. An edge linking two NFA 138 nodes represents a transition between two states. As illustrated in FIG. 1, the PPA 130 receives learned information from the EMA 125, for segment granularity adjustments 121. In some embodiments of the present invention, after performing processor micro-benchmarking 132, the program code supplies "loud" instruction mix segments (i.e., segments that generate distinguishable side-channel emanations) for program analysis micro-benchmarking 136, providing call flow graph (CFG) with loud marker segment annotations 137 for NFA generation 138.

In some embodiments of the present invention, one or more programs generate micro-benchmarks 150 to identify the kinds of processor instructions (e.g., machine code) and application logic (e.g., loops) that generate distinct side-channel emanations. These micro-benchmarks 150 can be loaded and run on a device 162, including on an IoT device. If the source code of the application logic executed on an IoT device is known, then micro-benchmarks 150 can be generated using parts of the application logic. In addition, for critical parts of application logic (e.g., logic of the device that may be sensitive in some way), as part of generating these micro-benchmarks 150, the one or more programs may boost the code segments (e.g., add certain instructions and/or operations that will make the identification of application code segments easier). When monitoring emanations, if the one or more programs detect side-channel emanations that match emanations associated with micro-benchmarks 150 the one or more programs may better characterize the device behavior and identify which application logic is being executed. For example, if a micro-benchmark corresponds to the user-authentication portion of the application, then the absence of emanations that match the emanations of this micro-benchmark implies that the device is not performing user authentication.

As will be discussed, certain embodiments of the present invention do not generate or apply micro-benchmarks 150. In some cases, the one or more programs may not be able to associate a specific side-channel emanation pattern with a particular device behavior. In this situation, although the one or more programs are able to determines that a device is exhibiting a specific behavior, the one or more programs may not be able to determine whether this behavior is user authentication, communications, sleeping, or something else.

Returning to FIG. 1, one or more programs in an embodiment of the present invention annotate each NFA node with timing and incoming edge information to capture information related to the duration the device spends in a given state when that state is reached via a specific previous state. Such timing information is used by one or more programs referred to as a Timing Anomaly Detector 148 (part of the Detector 140) to check whether the device starts diverging from the learned timing behavior. Such timing diversions may be due to additional operations carried out by the device when malware is present on the device.

PPA 130 may also insert boosting code during normal behavior characterization to improve detection fidelity and accuracy. The boosting code may be temporary—only for use during normal behavior characterization to support other subsystem functions (e.g., to enable MAS 110 to separate signals with known cyclostationary features, or to identify beginning and end of a function for EMA 125 timing behavior learning)—or permanent, when needed to enable detection at fidelity, during device monitoring. As illustrated in FIG. 1, with program-analysis benchmarking 136, the EMA 125 provides segment label markers 153 for timing behavior learning, i.e., learned timing model generation 129.

Some embodiments of the present invention operate in three principal phases, thus, one or more programs perform: 1) Micro-Benchmarking for Emanation Identification; 2) Normal Behavior Characterization; and 3) Monitoring. For ease of understanding, each of these phases is described with reference to the modular illustration of FIG. 1. However, this separation of functionality is provided for illustrative purposes and not to limit the technical architecture of the present invention. For example, functionalities represented by different modules may be performed by the same program and/or may be executed on the same processor(s).

Referring to FIG. 1, Micro-Benchmarking for Emanation Identification is performed by one or more programs comprising the PPA 130, the MAS 110, and the EMA 125. To micro-benchmark, the PPA 130, MAS 110, and EMA 125 analyze the device processor and software running on the device (when binaries are available) and create several micro-benchmarks 150 (i.e., small programs consisting of segments of processor instructions or known code) with associated identifying labels, for which the device generates significant analog emanations to differentiate among them. The PPA 130 may also insert additional code into the binaries ("boosting") to generate more identifiable emanations in important parts of the program in order to differentiate different portions of the software, based on the emanations. Important parts refer to parts of the execution logic of the device that may be sensitive in some way, including logic that authenticates a user or encrypts a message. In general, portions of the logic that are related to authentication or manipulation of values before they are sent out from the device would be considered important.

Based on the micro-benchmarking process and resulting emanations, one or more programs in the EMA 125 generate 127 (i.e., learn) a Learned Segment Model 128 that associates the labeled segments with expected emanations. Based on observed emanations, one or more programs apply the Learned Segment Model 128 to identify these segments, as they are executed during device operation. One or more programs in the PPA 130 generate a control flow graph (CFG) 137 of the device software and annotate it with these segment labels to identify occurrences of the labeled code segments (i.e., micro-benchmarks 150) within the software.

In embodiments of the present invention Normal Behavior Characterization, refers to one or more programs in the EMA 125 (in collaboration with MAS 110 and PPA 130) generating, based on runtime observations, a Learned Timing Model 129 of the normal timings of and between distinguishable labeled segments. Based on these observations, the one or more programs of a PPA 130 transform the segment-labeled CFG 137 into a Non-deterministic Finite Automaton (NFA) 138 that captures the typical states and state transitions of the device, allowing detection of unexpected state transitions.

One or more programs in the Detector 140 perform Monitoring. Specifically, the one or more programs utilize the Learned Segment Model 128 to identify 142 a time-stamped sequence of code segments from emanations captured by the MAS 110 and processed by the EMA 125. The one or more programs in the Detector 140 use the segment sequence to detect deviations from expected segment sequencing based on the NFA, to detect attacks that change the control flow of the program 143. In some embodiments of the present invention, in parallel to detecting the deviations, one or more programs in the Detector 140 apply the Learned Timing Model 131 to the segment sequence to find runtime code timing anomalies, such as whether a code segment is executing slower or faster than expected and/or whether the time lag between two segments is unusual.

Rather than performing Micro-Benchmarking for Emanation Identification, Normal Behavior Characterization, and Monitoring, to detect anomalies using side channel emanations, in some embodiments of the present invention, one or more programs detect anomalies in only two phases: 1) Normal Behavior Characterization; and 2) Monitoring.

To perform Normal Behavior Characterization in a two-phase embodiment of the present invention, one or more programs of the MAS 110 and EMA 125 collect and analyze side channel emanations, while the device is running. As part of this analysis, the one or more programs identify distinct emanation patterns (e.g., waveforms for radio frequency emanations) and timing characteristics, associated with transitions between such patterns. The one or more programs correlate these identified emanation patterns with specific device states and one or more programs of the PPA 130 construct 138 an NFA that captures the identified device states and state transitions (with timing information).

To perform the Monitoring phase in a two-phase embodiment of the present invention, one or more programs in the Detector 140 utilize the (control flow) NFA 139, which was generated (e.g., constructed) 138 during the normal behavior characterization phase, to check (in a control flow detector 143) whether the device is exhibiting anomalous behavior by identifying suspicious behaviors, including but not limited to, unknown device states and/or invalid timing between state transitions. To identify suspicious states, one or more programs validate device state and timing information generated by one or more programs of the MAS 110 and EMA 125.

In some embodiments of the present invention, an NFA generated for one device may be utilized to monitor one or more devices that share the same architectural and execution logic properties as this initial device. This is possible when the devices are of the same class. For example, the devices may share the same device manufacturer, processor, memory, and/or running applications. When detecting anomalies in a group of similar devices (e.g., same class), the one or more programs complete a Normal Behavior Characterization phase utilizing one or more devices and then execute the Monitoring phase for each device in the same class, sharing the NFA constructed during the first phase.

While some embodiments of the present invention are described herein in the context of a single modality, the one or more programs comprising the Normal Behavior Characterization and Monitoring phases can use multiple modalities. In particular, for concurrently captured emanations corresponding to different modalities (e.g., RF and acoustic) or the same modality but using different apparatus (e.g., different antennas) or apparatus orientation and/or distance from the device (e.g., 1 in and 12 in distance), one or more programs of the EMA 125 can identify distinct device states and state transitions by using a combination or some/all of the MAS-generated feature vectors for these modalities and settings.

One or more programs of the MAS 110 and the EMA 125 may use device RF emanations 105 to detect distinct device emanations in an automated manner, by identifying changes in the execution context of the device (e.g., running applications, application activity, etc.). As aforementioned, these one or more programs identify distinct device emanations 105 that correspond to specific device behavior (e.g., operations carried out by the device). The one or more programs identify execution changes based on RF emanation 105 changes by: 1) collecting emanations produced by a running device; 2) generating feature vectors that correspond to signal characteristics during fixed or varying time windows in the collected emanations; and 3) using the computed similarity values, identify significant changes in the collected emanations, which may reflect changes in the execution state of the device.

Identifying execution changes based on RF emanations 105 in embodiments of the present invention is similar is some ways to automatic audio segmentation technique described in the literature, including in 1) T. Theodorou, I. Mporas, N. Fakotakis. "An Overview of Automatic Audio Segmentation." International Journal of Information Technology and Computer Science (IJITCS), vol. 6, no. 11, pp. 1-9, 2014. DOI: 10.5815/ijitcs.2014.11.01; 2) E. Peiszer, T. Lidy, A. Rauber. "Automatic Audio Segmentation: Segment Boundary and Structure Detection in Popular Music." In Proceedings of the 2nd International Workshop on Learning the Semantics of Audio Signals (LSAS)", (2008), ISBN: 978-3-9804874-7-4; and 3) J. Foote. "Automatic audio segmentation using a measure of audio novelty." In Proc. ICME, volume 1, New York City, N.Y., USA, 2000. These items are incorporated herein by reference for all purposes. Embodiments of the present invention, and, specifically, the aspect of identifying execution changes based on RF emanation, differ from the technique in this literature at least because unlike audio signals, RF emanations 105 from IoT devices can range from few Hz to many GHz. In addition, RF signals require advanced signal processing techniques for removing noise and compute feature vectors that reflect IoT device behavior. Thus, as understood by one of skill in the art, the technique described in the literature is not directly transferable to RF signal emanation analysis. As understood by one of skill in the art, while certain of the discussion and illustration focus on RF emanations, the proposed method can be applied to any kind of emanations for which a frequency domain conversion function is available.

In some embodiments of the present invention one or more programs of the MAS 110 collect emanations produced by a running device using various techniques, including, but not limited to employing a software defined radio receiver using one or multiple antennae.

To generate feature vectors that correspond to signal characteristics during fixed or varying time windows in the collected emanations the one or more programs may perform a fast Fourier transform (FFT) combined with principal component and independent component analysis. This approach is effective because time windows may overlap up to a configurable percentage.

The one or more programs determine the similarity between (a configurable number of) adjacent time windows using the computed feature vectors. The one or more programs may utilize a cosine similarity measure to make this determination. The one or more programs determine the cosine similarity between feature vectors A and B using the Euclidean dot product formula, Formula 1.

$$\text{similarity} = \cos(\vartheta) = \frac{A \cdot B}{\|A\|\|B\|} \quad \text{(Formula 1)}$$

Figure 2:
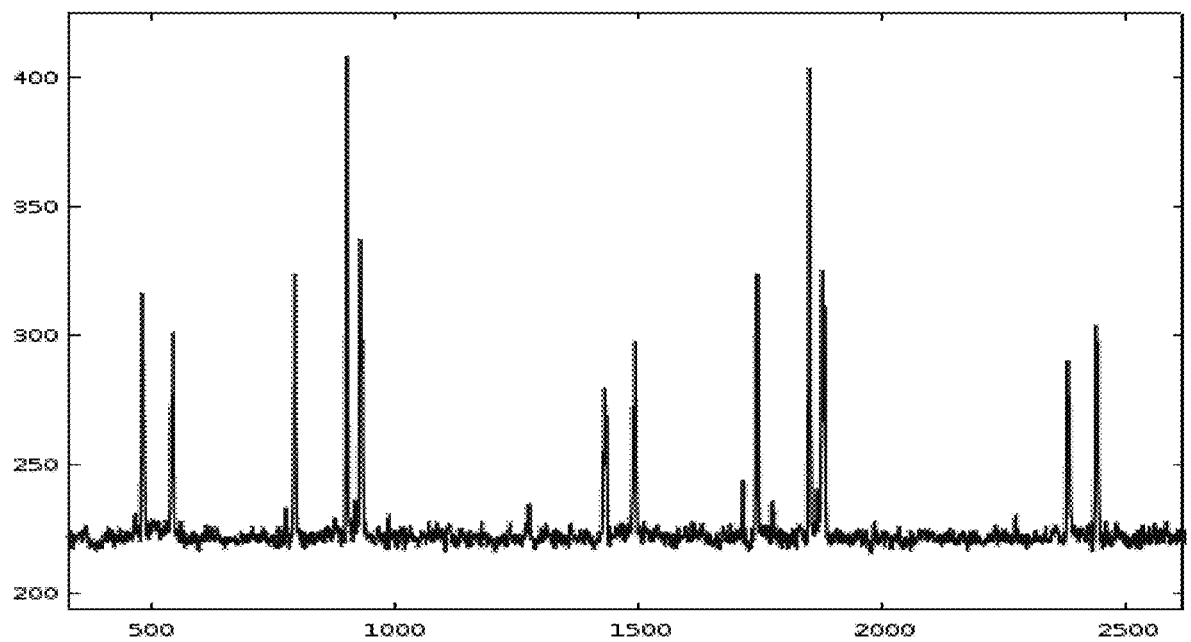
FIG. 2 is an example of computed significant changes in device emanation behavior.

Using the computed similarity values, the one or more program identify significant changes in the collected emanations, which may reflect changes in the execution state of the device. The one or more programs can identify these changes when, for example, the average similarity value of a configurable number of consecutive time windows differs by c from the average similarity value of the immediately next group of consecutive time windows for a given time t. FIG. 2 illustrates an example of computed significant changes in device emanation behavior; the x-axis corresponds to time and the y-axis corresponds to the magnitude of the change. Thus, FIG. 2 is an example of execution context transition identification, which is performed by one or more programs in embodiments of the present invention.

Figure 3:
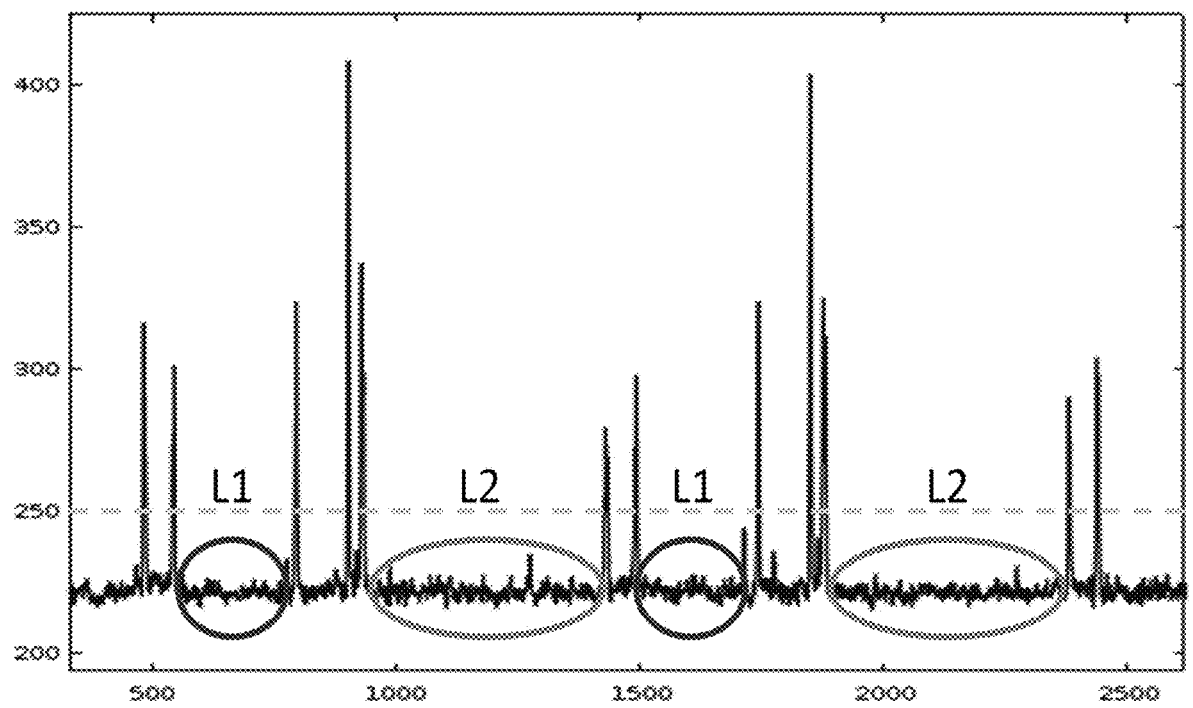
FIG. 3 illustrates labeling of emanations based on their magnitude values in accordance with some embodiments of the present invention.

In embodiments of the present invention, once the one or more programs identify significant changes in the collected emanations (i.e., deviations from the generated normal state), the one or more programs identify similar emanation patterns, based on the computed similarity values and identified transitions. The one or more program label the similar emanation patterns. To this end, FIG. 3 illustrates the labeling of emanations based on their magnitude values. As illustrated in FIG. 3, two pairs of similar deviations have been identified, two have been labeled L1 and two have been labeled L2. As explained below, in various embodiments of the present invention, one or more programs may utilize a variety of different methods to assign labels to like segments.

One or more programs in some embodiments of the present invention assign labels, as illustrated in FIG. 3, by 1) selecting a magnitude change value to be used for segmentation; 2) computing all emanation time windows having similarity values less than the chosen value; 3) grouping these windows based on how close theirs similarity values are (e.g., the one or more program may utilize a threshold value in this determination); 4) for windows with similar similarity values, computing similarity of the emanations using corresponding feature vectors; and 5) assigning a same label to windows with similar feature vectors.

In other embodiments of the present invention, to assign labels to like segments, the one or more programs: 1) select a magnitude change value and minimum time duration (width) to be used for segmentation; 2) compute all emanation time windows having similarity values less than the chosen value and whose time duration is greater than or equal to a specified minimum time duration; 3) group these windows based on how close their similarity values are (subject to a threshold value); 4) for windows with similar similarity values, compute similarity of their emanations using the corresponding feature vector; and 5) assign a same label to windows with similar feature vectors.

Figure 4:
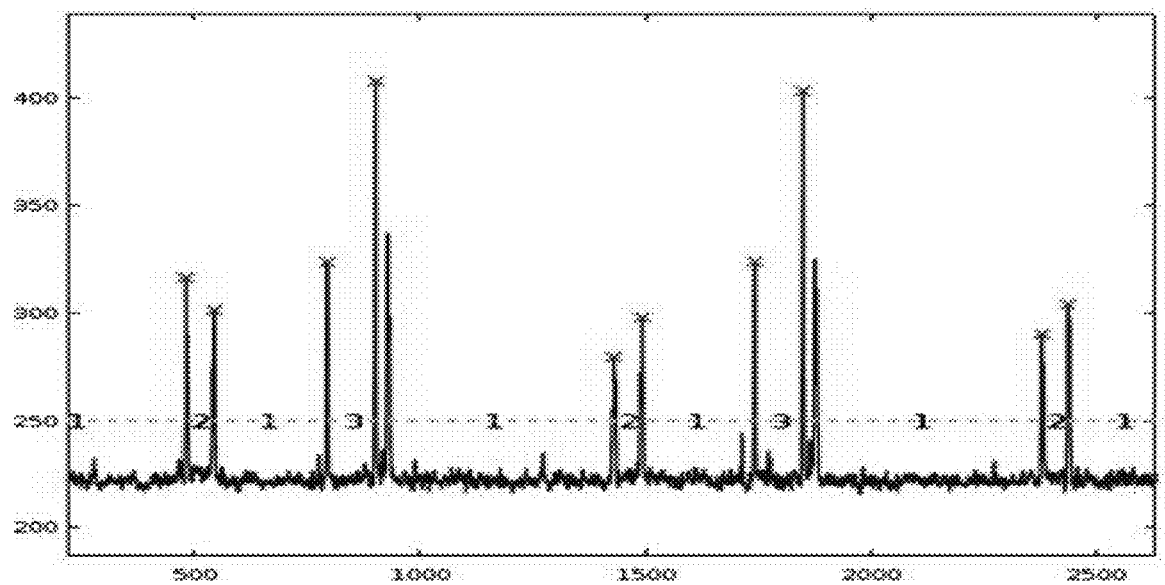
FIG. 4 illustrates labeling of emanations based on their magnitude values in accordance with some embodiments of the present invention.

In addition to magnitude, as illustrated in FIG. 3, one or more programs in some embodiments of the present invention label like emanations based on duration as well. By selecting different magnitude change and width values, different sets of labels may be generated. In some embodiments of the present invention, the one or more programs assign labels by: 1) selecting a magnitude change value and, optionally, a minimum time duration (width) to be used for segmentation; 2) computing all emanation time windows bounded by magnitude change values greater than (or equal to) the chosen value and, optionally, whose time duration is greater than or equal to a specified minimum time duration; 3) assigning a same label to windows with similar time duration values. FIG. 4 illustrates segment labeling using magnitude and duration. Specifically, FIG. 4 illustrates an instance of assigning labels to like segments in accordance with some embodiments of the present invention, for a magnitude value of 250 and width 50.

Figure 5:
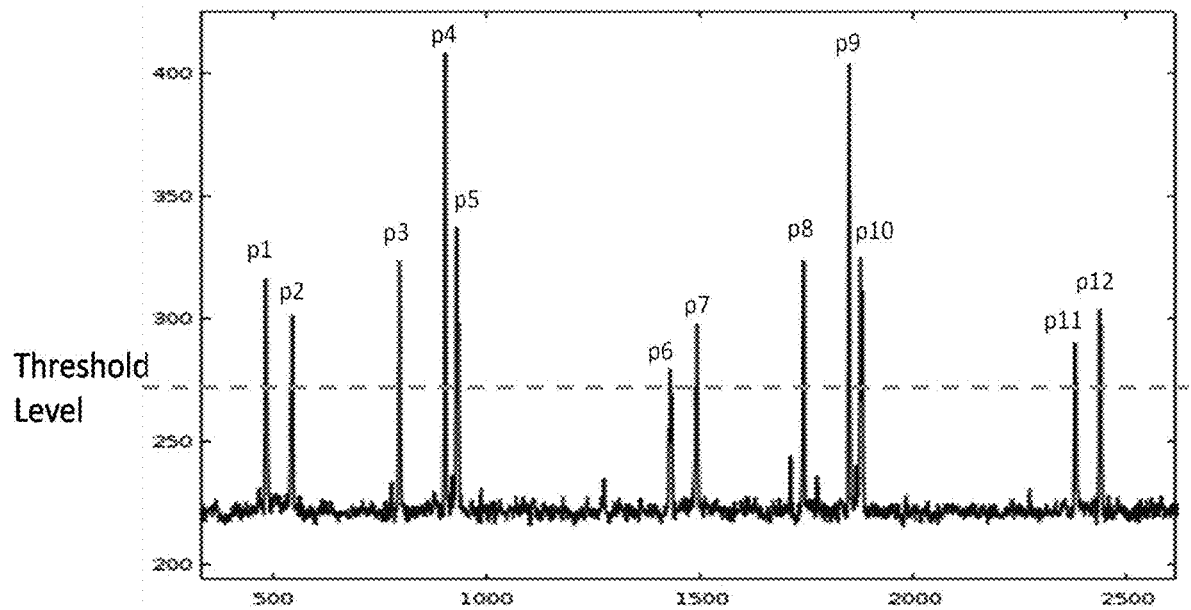
FIG. 5 illustrates the identification of repeated IoT device logic execution based on emanations and duration in accordance with some embodiments of the present invention.

In some embodiments of the present invention, the one or more programs identify repeated IoT device logic execution based on emanations and duration. As such, FIG. 5 illustrates one or more programs identifying the overall period of repeated program execution. Specifically, for devices characterized by periodic execution of specific logic (e.g., temperature sensing every 1 minute), one or more programs in an embodiment of the present invention may assign labels (to identify like changes in emanations) by analyzing the time duration (on the x-axis) between peaks above a given magnitude threshold. The one or more programs perform this analysis to identify the periodicity of the various device execution states. Once the periodicity is identified, the one or more programs can label device execution states within each execution period.

Figures 6, 7:
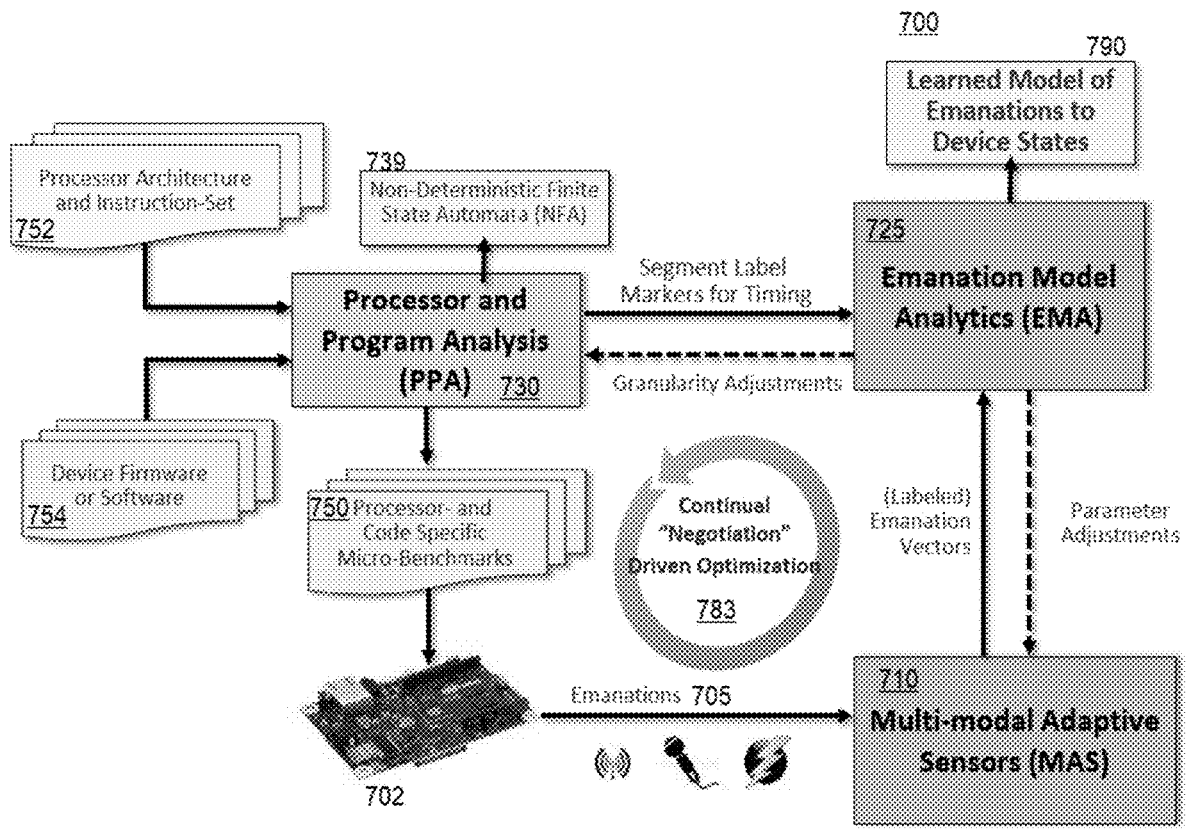
FIG. 6 provides a distance matrix for the peaks shown in FIG. 5.
FIG. 7 depicts certain aspects of an embodiment of the present invention.

For one or more programs in an embodiment of the present invention may assign labels (to identify like changes in emanations) by analyzing the time duration (on the x-axis) between peaks above a given magnitude threshold, as seen in FIG. 5, by identifying and labeling each peak (p1 p2 . . . pn) that is above a given magnitude threshold level. For each peak, pi, the one or more programs calculate the distance on the x-axis (time units) from all other peak. FIG. 6, which is a table, provides the distance matrix for the peaks shown FIG. 1. FIG. 6 is a table of timeslot distances between peaks.

Returning to the assignment illustrated in FIG. 5, the one or more programs compare computed distances between identified peaks and compute sets of consecutive peaks that are the same distance apart from each other (pair wise). For example, in the information shown in FIG. 6, the following sets are the same distance apart: {p1, p2, p3, p4, p5} and {p6, p7, p8, p9, p10} are 890 time units apart, {p1, p2, p3, p4, p5} and {p11, p12, p13, p14, p15} are 1780 time units apart, {p6, p7, p8, p9, p10} and {p11, p12, p13, p14, p15} are 890 time units apart. Using the computed peak sets, the one or more programs identify the sets with time durations that are multiples of each other (subject to some threshold 6 to account for slight time variations in periodic activity executions) and collapse them into just one set that encompasses a number of device execution states that repeat. For example, based on the sets computed in the previous step, {p1, p2, p3, p4, p5}, {p6, p7, p8, p9, p10}, and {p11, p12, p13, p14, p15} are collapsed into a single set with 5 repeating device execution steps (1780 is a multiple of 890) that correspond to the following time intervals [p, p2), [p2, p3), [p3, p4), [p4, p5), and [p5, p6). For each of the computed collapsed sets from the previous step, the one or more programs assign labels to the emanations that correspond to the time intervals associated with these sets.

FIG. 2-5 provide examples of embodiments of the present invention that include one or more programs selecting the magnitude change value and width, based on inputs, the process of selecting these values could be automated in a number of ways. For example, when knowledge about the number of distinct IoT device processing states is available, this information can be used by the one or more programs for selecting a magnitude value that results in a number of distinct segments that is related to the number of processing states (e.g., in a linear manner). Similarly, when timing information about the various IoT device states is available, one or more programs in an embodiment of this invention may utilize this information for selecting a magnitude value that results in distinct segments with durations that are related to the known timing information (e.g., in a linear manner). In addition, in an embodiment of the present invention, an additional one or more program may select magnitude and width values may be carried. The additional one or more programs may perform machine learning component and/or program analysis, via an iterative process, to select these values.

In some embodiments of the present invention, one or more programs identify whether two specific labels are related, such as one corresponding to repeated executions of the other (e.g., sleep for 2 seconds corresponds to repeating sleep for 1 second twice), utilizing additional methods. For example, the one or more programs may first identify labels that correspond to device execution state durations that are multiple of each other (subject to some threshold 6 to account for slight time variations) and then compare their emanation vectors for similarity.

Embodiments can be extended to include the use of several different magnitude values and widths. By doing so, different sets of labels may be generated, one set for each of the selected magnitude values and widths. Correlations among these labels could be used for detecting anomalous behavior at one or more magnitudes when the IoT device is infected by malware.

Figure 8:
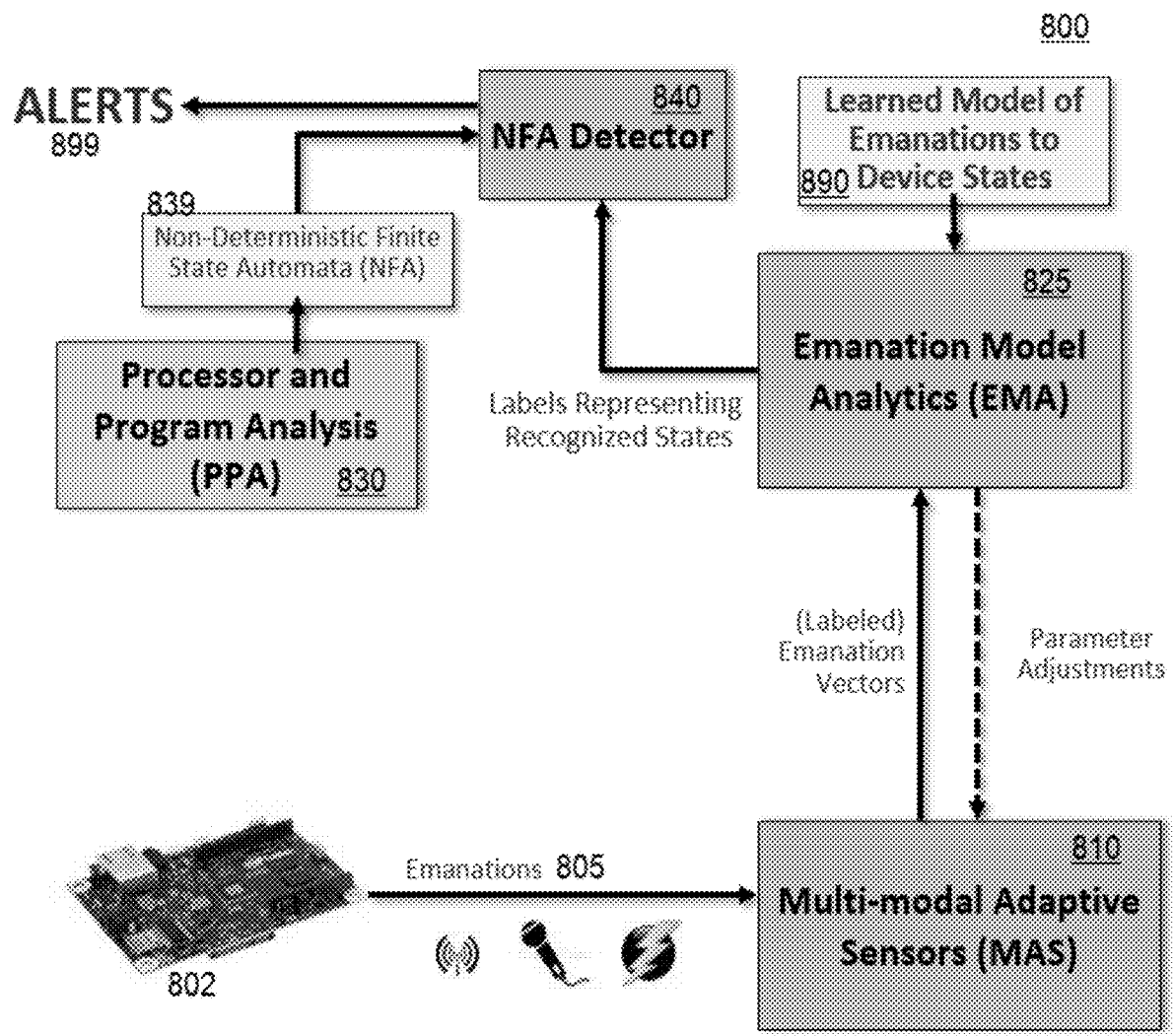
FIG. 8 depicts certain aspects of an embodiment of the present invention.

FIG. 7 provides a further illustration of the benchmarking and/or training executed by one or more programs in some embodiments of the present invention. FIG. 8 provides a further illustration of the monitoring executed by one or more programs in some embodiments of the present invention. In some embodiments of the present invention, monitoring includes taking a defensive action, based on identifying an anomaly while monitoring.

Referring to FIG. 7, in some embodiments of the present invention, one or more programs generate a learned model of emanations to device states 790 of a device 702, for use in the monitoring stage (monitoring the device 702 to detect anomalies), which is illustrated in FIG. 8. As illustrated in FIG. 7, in order to generate the emanations to device states 790, one or more programs performing EMA 725 obtain labeled emanation vectors from MAS 710, and/or one or more programs performing EMA 725 obtain segment label markers for timing, from the one or more programs performing PPA 730 (as discussed above, the one or more programs can be common or separate programs and are separated into these distinct aspects for illustrative purposes only, not to impose any limitations on embodiments of the present invention). The MAS monitor emanations 705 from a device 702. The one or more programs performing EMA 725 adjust data from the MAS 710 with parameter adjustments, if needed, and provide the one or more programs performing PPA 730 with granularity adjustments, if needed. This back and forth can be characterized as a continual negotiation driven optimization 783.

In some embodiments of the present invention, the one or more programs create models of analog emanations expected for device software segments. As discussed in FIG. 1, the PPA 730 one or more programs performing provide the one or more programs performing EMA 725 with segment label markers for timing, in part, based on generating micro-benchmarks (processor and/or code specific) 750, which can be loaded into the device 702. The one or more programs performing EMA 725 generate processor and/or code specific micro-benchmarks 750, respectively, based on obtaining and analyzing: 1) a processor architecture and instruction set 752 of the device 702; and 2) device firmware and/or software 754 of the device 702. Thus, in embodiments of the present invention where micro-benchmarking is possible (access to the processor architecture and instruction set 752 and/or access to device firmware and/or software 754 is available), the monitoring of the device 702 to detect anomalies (as described in FIG. 8), can be based on one or more programs identifying a deviation in emanations from the device 702 at a micro-benchmark from expected emanations from the device at the micro-benchmark. In embodiments of the present invention where the one or more programs perform micro-benchmarking, the one or more programs generate a NFA 739 that is a normal timing model for device software segments.

While the learned model 790 in embodiments of the present invention maps emissions to device states to generate device state labels (enabling the program code to label unrecognized emissions as "unknown"), the NFA 739 enables the program code to check a sequence of labels against a state machine and produce an alert (or other action) when the program code identified a deviation due to "unknown" labels or illegal transitions. As discussed in FIG. 1, in certain embodiments of the present invention, there is no micro-benchmarking phase and/or the micro-benchmarking phase is combined with a modeling phase where the one or more programs derive an NFA 739 (model). An NFA 739, can change based on the availability of data utilized by the one or more programs to build this model. As explained in the discussion of FIG. 1, and illustrated in FIG. 7, an NFA 739, is a normal timing model for device software segments (when the segments are available), and non-deterministic finite automata (NFA) model for typical states and state transitions of the device 702. In some embodiments, segments are not available. Thus, in some embodiments of the present invention, one or more programs performing PPA constructs an NFA 739 using the device states and state transitions identified by one or more programs performing EMA 725 (based on the MAS 710 collecting and the one or more programs of the EMA 725 analyzing side channel emanations, while the device is running). Each distinct device state corresponds to a node in the NFA 739. As part of this analysis, the one or more programs identify distinct emanation patterns (e.g., waveforms for radio frequency emanations) and timing characteristics, associated with transitions between such patterns. The one or more programs correlate these identified emanation patterns with specific device states and one or more programs of the PPA 730 construct 739 an NFA 739 that captures the identified device states and state transitions (with timing information).

The learned model of emanations to device states 790 of a device 702 generated by one or more programs performing EMA 725 include one or more of: 1) models of analog emanations expected for device software segments (based on micro-benchmarking); and/or 2) models for typical states and state transitions of the device.

FIG. 8 illustrates a monitoring phase in certain embodiments of the present invention, where one or more programs: 1) isolate and amplify device 802 emissions 805 from all the other devices and process the emissions 805 (signals) to convert the device 802 emissions 805 into a form usable by the rest of the system; 2) utilize the earlier-generated learned model 890 maps emissions to device states to generate device state labels; and 3) utilize the NFA 839 to check the sequence of labels against a state machine and alert (or provide another defensive action) when the detecting deviations due to unknown labels or illegal transitions. In order to identity an anomaly, the MAS 810 provide emanations 805 from the device 802 to one or more programs performing EMA 825 (the one or more programs provide parameter adjustments). One or more programs obtain the emanations 805 as labeled emanation vectors from the MAS 810 monitoring the device 802. The one or more programs performing EMA 825 also utilize the learned model 890 to provide labels representing recognized states of the device to one or more programs that detects 840 deviations from the NFA 839. These one or more programs are labeled an NFA Detector 840 in FIG. 8, and presented as a separate entity from the EMA 825 program(s), but this functionality can be combined and is illustrated separately for clarity, only. The NFA 839 is provided through one or more programs performing PPA 830. Again, these programs are not necessarily distinct but are illustrated as such for clarity, not to inject limitations. The one or more programs of the NFA Detector 840 utilize the NFA 839 and the labels from the learned model 890 to provide alerts 899 (or other actions), upon recognizing an anomaly.

Figure 9:
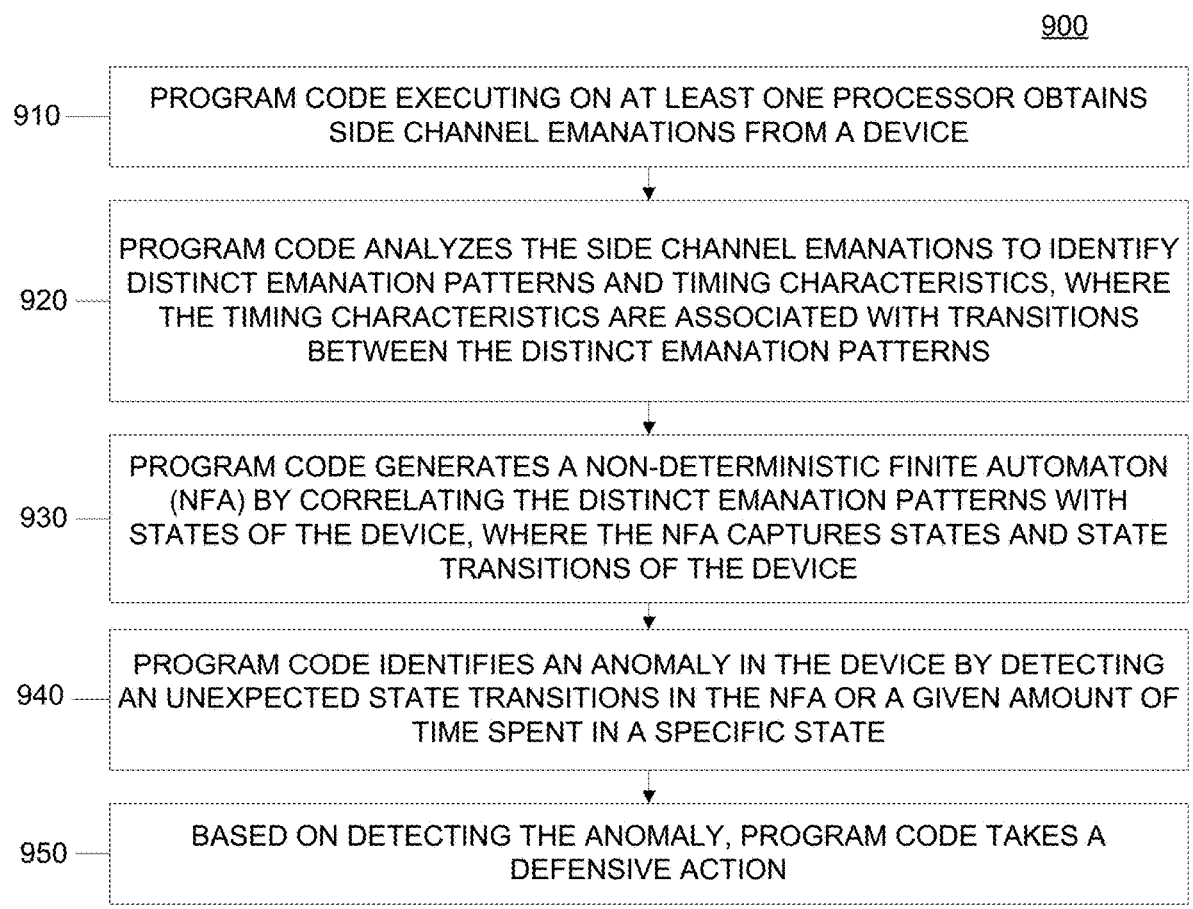
FIG. 9 depicts a workflow illustrating some aspects of some embodiments of the present invention.
Figure 10:
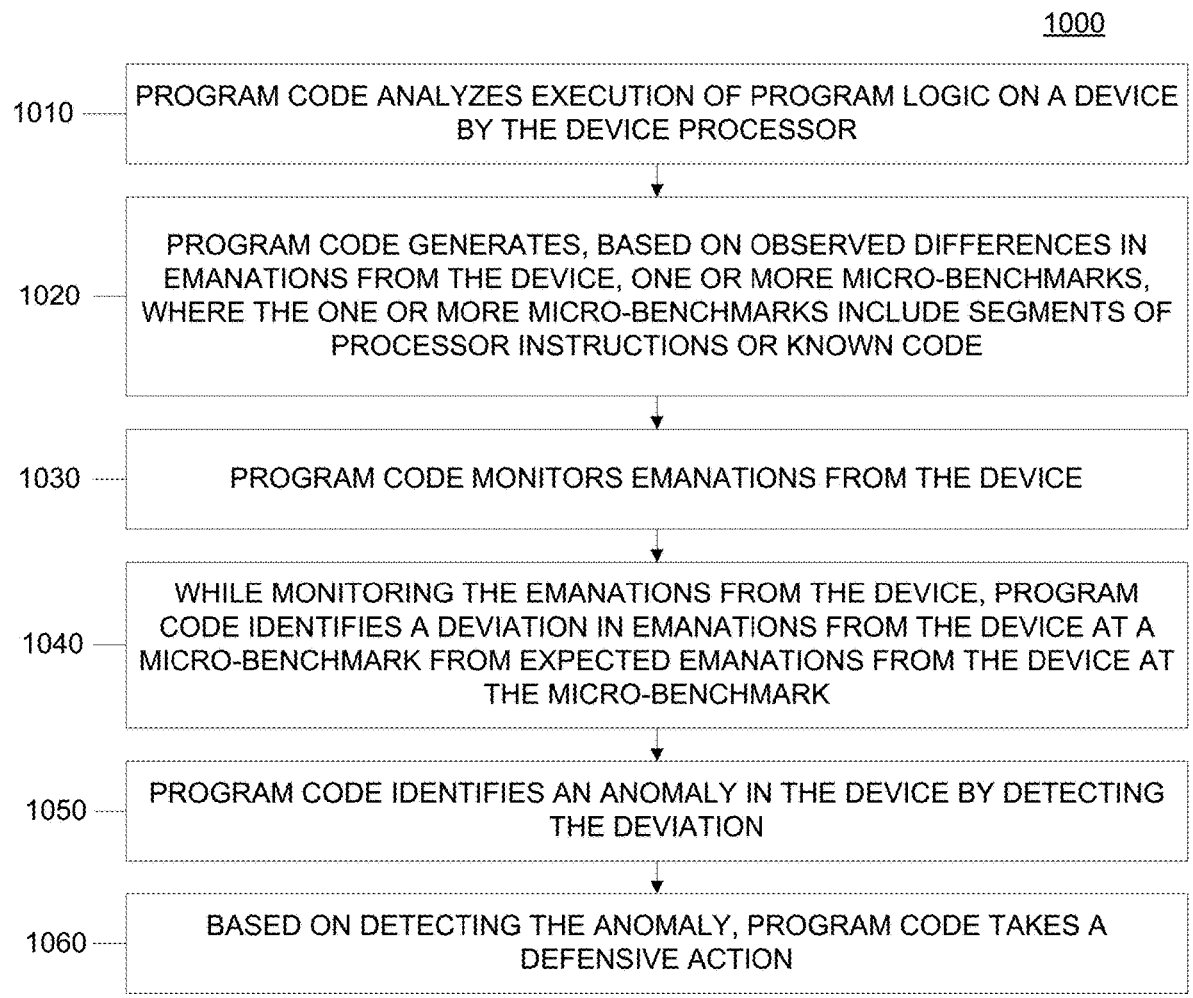
FIG. 10 depicts a workflow illustrating some aspects of some embodiments of the present invention.

As explained in reference to FIG. 1, certain embodiments of the present invention include the program code generating micro-benchmarks, while in other embodiments the program code determines distinct emanation patterns and timing characteristics to identify anomalies, in the absence of micro-benchmarking. In further embodiments of the present invention, these two phases are combined. FIGS. 9-10 are both workflows that illustrates certain aspects of some embodiments of the present invention where the program code analyzes side channel emanations to detect anomalies both without (e.g., FIG. 9) and with (e.g., FIG. 10) benchmarking.

FIG. 9 is a workflow 900 which illustrates certain aspects of some embodiments of the present invention, including embodiments that are the computer-implemented methods, computer systems, and computer program products, wherein the program code does not generate and utilize micro-benchmarks. In some embodiments of the present invention, program code executing on at least one processor obtains side channel emanations from a device (910). The device can be an Internet of Things device and/or can include an embedded microcontroller or an embedded microprocessor. The program code analyzes the side channel emanations to identify distinct emanation patterns and timing characteristics, where the timing characteristics are associated with transitions between the distinct emanation patterns (920). The distinct emanation patterns and the timing characteristics can include statistics properties of time spent in each emanation pattern of the distinct emanation patterns.

Returning to FIG. 9, the program code generates a non-deterministic finite automaton (NFA) by correlating the distinct emanation patterns with states of the device, where the NFA captures states and state transitions of the device (930). The program code identifies an anomaly in the device by detecting an unexpected state transitions in the NFA or a given amount of time spent in a specific state (940). These states and state transitions can include timing characteristics.

Based on detecting the anomaly, the program code takes a defensive action (950). In some embodiments of the present invention, the defensive action includes the program code disabling network communications from the device, based on identifying the anomaly. In some embodiments of the present invention, the defensive action includes alerting a user of the device to the anomaly.

FIG. 10 is a workflow 1000 which illustrates certain aspects of some embodiments of the present invention, including embodiments that are the computer-implemented methods, computer systems, and computer program products, wherein the program code does generates and utilizes micro-benchmarks. As illustrated in FIG. 10, in some embodiments of the present invention, the program code analyzes execution of program logic on a device by the device processor (1010). The program code generates, based on observed differences in emanations from the device, one or more micro-benchmarks, where the one or more micro-benchmarks include segments of processor instructions or known code (1020). The program code monitors emanations from the device (1030). While monitoring the emanations from the device, the program code identifies a deviation in emanations from the device at a micro-benchmark from expected emanations from the device at the micro-benchmark (1040). The program code identifies an anomaly in the device by detecting the deviation (1050). Based on detecting the anomaly, the program code takes a defensive action (1060). In some embodiments of the present invention, the defensive action includes the program code disabling network communications from the device, based on identifying the anomaly. In some embodiments of the present invention, the defensive action includes alerting a user of the device to the anomaly.

FIG. 10 illustrates a block diagram of a resource 400 in computer system, such as, which is part of the technical architecture of certain embodiments of the technique. Returning to FIG. 10, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 10 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 11:
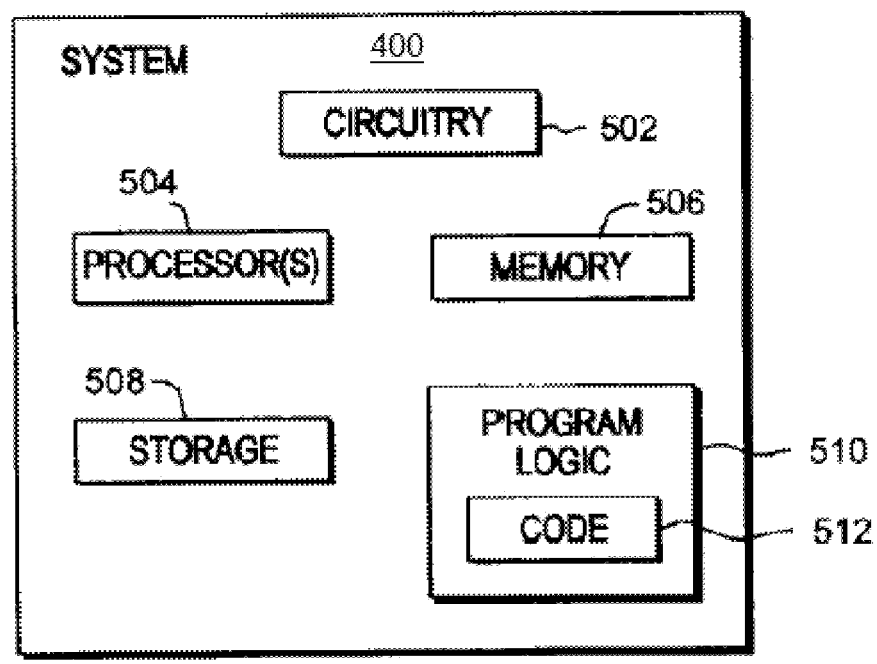
FIG. 11 depicts a computer system configured to perform an aspect of an embodiment of the present invention.
Figure 12:
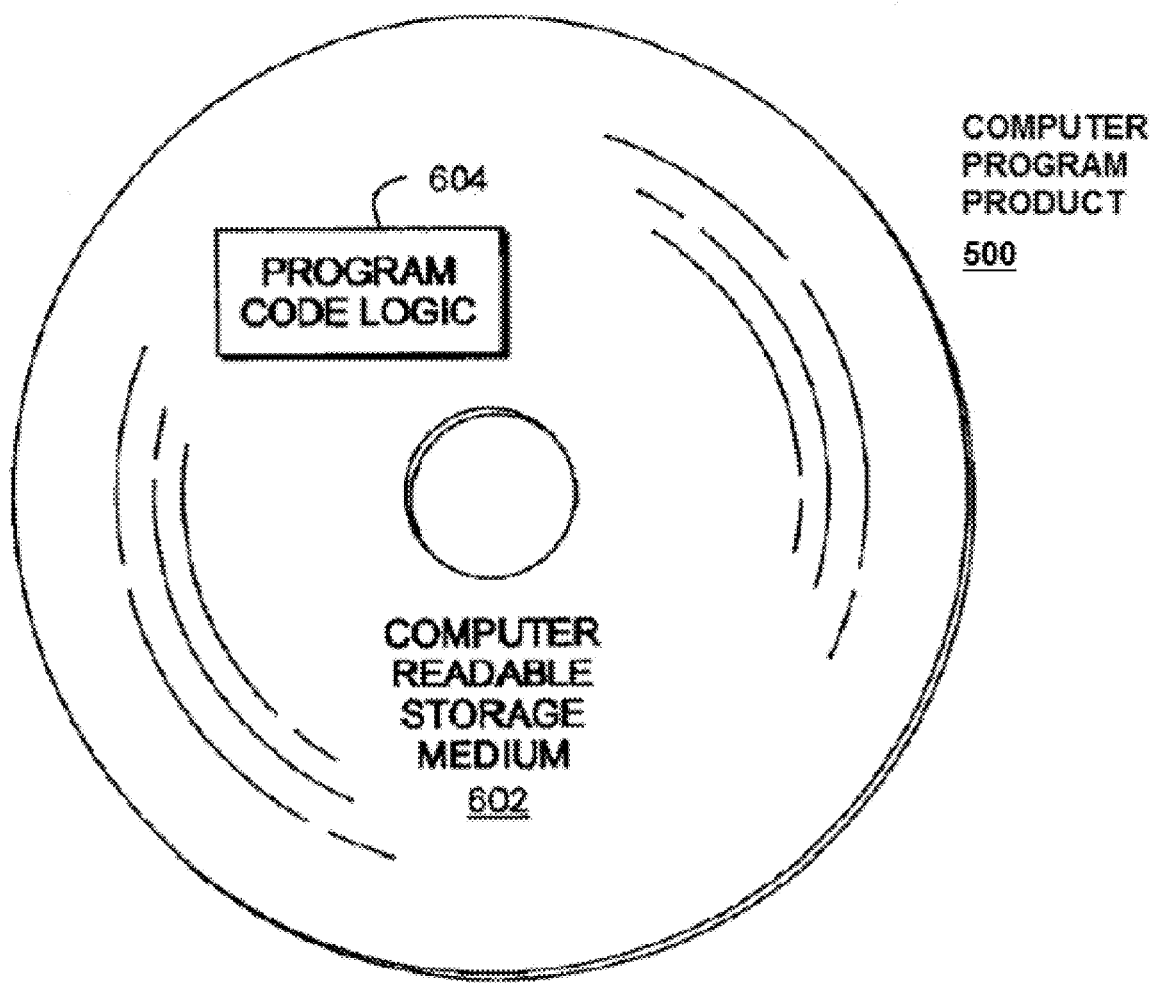
FIG. 12 depicts a computer program product incorporating one or more aspects of the present invention.

Using the processing resources of a resource 400 to execute software, computer-readable code or instructions, does not limit where this code can be stored. Referring to FIG. 11, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PUP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method, comprising:
   obtaining, by one or more processors, side channel emanations from a device;
   analyzing, by the one or more processors, the side channel emanations to identify distinct emanation patterns and timing characteristics, wherein the timing characteristics are associated with transitions between the distinct emanation patterns;
   generating, by the one or more processors, a non-deterministic finite automaton (NFA) by correlating the distinct emanation patterns with states of the device, wherein the NFA captures states and state transitions of the device, and wherein correlating the distinct emanation patterns with states of the device further comprises:
      mapping, by the one or more processors, emissions comprising the emanation patterns to device states to generate device state labels; and
   identifying, by the one or more processors, an anomaly in the device, based on deviation in emanations from the device.

2. The computer-implemented method of claim 1, further comprising:
   disabling, by the one or more processors, network communications from the device, based on identifying the anomaly.

3. The computer-implemented method of claim 1, further comprising:
   alerting, by the one or more processors, a user of the device to the anomaly.

4. The computer-implemented method of claim 1, wherein the device is an Internet of Things device.

5. The computer-implemented method of claim 1, wherein the distinct emanation patterns and the timing characteristics comprise statistics properties of time spent in each emanation pattern of the distinct emanation patterns.

6. The computer-implemented method of claim 1, wherein the states and the state transitions comprise timing characteristics.

7. The computer-implemented method of claim 1, wherein the device comprises at least one of: an embedded microcontroller or an embedded microprocessor.

8. The computer-implemented method of claim 1, wherein identifying the anomaly comprises detecting a deviation in emanations from the device at a micro-benchmark, the method further comprising:
   analyzing, by one or more processors, execution of program logic on a device by the device processor;
   generating, by the one or more processors, based on observed differences in emanations from the device, one or more micro-benchmarks, wherein the one or more micro-benchmarks comprise segments of processor instructions or known code; and
   monitoring, by the one or more processors, emanations from the device, wherein the monitoring identifies the deviation in emanations from the device at the micro-benchmark from expected emanations from the device at the micro-benchmark.

9. The computer-implemented method of claim 1, wherein the identifying further comprises:
   monitoring, by the one or more processors, side channel emanations from the device, wherein the device is communicatively coupled to one or more computing resources in a computer system, wherein the monitoring further comprises:
   isolating, by the one or more processors, side channel emanations from the device, from emissions of devices physically adjacent to the device;
   amplifying, by the one or more processors, the side channel emanations from the device; and
   converting, by the one or more processors, the side channel emanations from the device, into a data format for the one or more computing resources.

10. The computer-implemented method of claim 1, wherein the anomaly based on the deviation in emanations from the device is selected from the group consisting of: an unexpected state transitions in the NFA and a given amount of time spent in a specific state.

11. The computer-implemented method of claim 1, wherein the mapping comprises labelling unrecognized emissions of the emissions as unknown.

12. The computer-implemented method of claim 11, wherein the anomaly based on the deviation in emanations from the device due to the unrecognized emissions.

13. The computer-implemented method of claim 1, wherein the device comprises a printer.

14. A computer program product comprising:
   a non-transitory computer readable storage medium readable by one or more processors and storing instructions for execution by the one or more processors for performing a method comprising:
   obtaining, by the one or more processors, side channel emanations from a device;
   analyzing, by the one or more processors, the side channel emanations to identify distinct emanation patterns and timing characteristics, wherein the timing characteristics are associated with transitions between the distinct emanation patterns;
   generating, by the one or more processors, a non-deterministic finite automaton (NFA) by correlating the distinct emanation patterns with states of the device, wherein the NFA captures states and state transitions of the device, and wherein correlating the distinct emanation patterns with states of the device further comprises:
      mapping, by the one or more processors, emissions comprising the emanation patterns to device states to generate device state labels; and
   identifying, by the one or more processors, an anomaly in the device, based on deviation in emanations from the device.

15. The computer program product of claim 14, the method further comprising an action selected from the group consisting of:
   disabling, by the one or more processors, network communications from the device, based on identifying the anomaly; and alerting, by the one or more processors, a user of the device to the anomaly.

16. The computer program product of claim 14, wherein the anomaly based on the deviation in emanations from the device is selected from the group consisting of: an unexpected state transitions in the NFA and a given amount of time spent in a specific state.

17. The computer program product of claim 14, wherein identifying the anomaly comprises detecting a deviation in emanations from the device at a micro-benchmark, the method further comprising:
- analyzing, by one or more processors, execution of program logic on a device by the device processor;
- generating, by the one or more processors, based on observed differences in emanations from the device, one or more micro-benchmarks, wherein the one or more micro-benchmarks comprise segments of processor instructions or known code; and
- monitoring, by the one or more processors, emanations from the device, wherein the monitoring identifies the deviation in emanations from the device at the micro-benchmark from expected emanations from the device at the micro-benchmark.

18. A system comprising:
a memory;
one or more hardware processors in communication with the memory;
and program instructions executable by the one or more processors via the memory to perform a method, the method comprising:
- obtaining, by the one or more processors, side channel emanations from a device;
- analyzing, by the one or more processors, the side channel emanations to identify distinct emanation patterns and timing characteristics, wherein the timing characteristics are associated with transitions between the distinct emanation patterns;
- generating, by the one or more processors, a non-deterministic finite automaton (NFA) by correlating the distinct emanation patterns with states of the device, wherein the NFA captures states and state transitions of the device, and wherein correlating the distinct emanation patterns with states of the device further comprises:
  - mapping, by the one or more processors, emissions comprising the emanation patterns to device states to generate device state labels; and
- identifying, by the one or more processors, an anomaly in the device, based on deviation in emanations from the device.

19. The system of claim 18, wherein identifying the anomaly comprises detecting a deviation in emanations from the device at a micro-benchmark, the method further comprising:
- analyzing, by one or more processors, execution of program logic on a device by the device processor;
- generating, by the one or more processors, based on observed differences in emanations from the device, one or more micro-benchmarks, wherein the one or more micro-benchmarks comprise segments of processor instructions or known code; and
- monitoring, by the one or more processors, emanations from the device, wherein the monitoring identifies the deviation in emanations from the device at the micro-benchmark from expected emanations from the device at the micro-benchmark.

20. The computer system of claim 18, wherein the anomaly based on the deviation in emanations from the device is selected from the group consisting of: an unexpected state transitions in the NFA and a given amount of time spent in a specific state.

* * * * *